(12) United States Patent
Satoh et al.

(10) Patent No.: US 10,692,198 B2
(45) Date of Patent: Jun. 23, 2020

(54) IMAGE PROCESSING APPARATUS, IMAGE PROCESSING METHOD, IMAGE PROCESSING SYSTEM, AND NON-TRANSITORY COMPUTER-READABLE STORAGE MEDIUM FOR PRESENTING THREE-DIMENSIONAL IMAGES

(71) Applicant: CANON KABUSHIKI KAISHA, Tokyo (JP)

(72) Inventors: Kiyohide Satoh, Kawasaki (JP); Takuya Ishida, Tokyo (JP); Takaaki Endo, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/970,752

(22) Filed: Dec. 16, 2015

(65) Prior Publication Data

US 2016/0180526 A1 Jun. 23, 2016

(30) Foreign Application Priority Data

Dec. 22, 2014 (JP) .................................. 2014-259275

(51) Int. Cl.
*G06T 5/50* (2006.01)
*G06T 5/00* (2006.01)

(52) U.S. Cl.
CPC ................ *G06T 5/50* (2013.01); *G06T 5/007* (2013.01); *G06T 2207/10088* (2013.01); *G06T 2207/30068* (2013.01); *G06T 2207/30096* (2013.01)

(58) Field of Classification Search
None
See application file for complete search history.

(56) References Cited

U.S. PATENT DOCUMENTS 8,265,728 B2 * 9/2012 MacMahon ............ A61B 6/463
378/5
8,442,286 B2 5/2013 Imamura et al.
9,058,647 B2 * 6/2015 Ishida ................... G06T 7/0012
(Continued)

FOREIGN PATENT DOCUMENTS

JP H10137190 A 5/1998
JP 2007-014525 A 1/2007
(Continued)

OTHER PUBLICATIONS

Japanese Office Action dated Jul. 30, 2018 and issued in corresponding Japanese Patent Application No. 2014-259275.

*Primary Examiner* — Tahmina N Ansari
(74) *Attorney, Agent, or Firm* — Carter, DeLuca & Farrell LLP

(57) ABSTRACT

An image processing apparatus obtains a region of interest in a first image obtained by capturing an object by a first modality, derives a corresponding region corresponding to the region of interest in a second image obtained by capturing the object by a second modality different from the first modality, sets a display parameter of the second image based on one of pixel information of the corresponding region and pixel information of a region associated with the corresponding region, generates a display image of the second image based on the display parameter, and performs display control of the display image.

18 Claims, 5 Drawing Sheets

(56) References Cited

U.S. PATENT DOCUMENTS

| | | | |
|---|---|---|---|
| 2004/0175760 A1* | 9/2004 | Crevier | B01J 19/0046 435/7.1 |
| 2010/0194750 A1* | 8/2010 | Mielekamp | G06T 19/00 345/424 |
| 2012/0177277 A1* | 7/2012 | Florent | A61B 5/02007 382/132 |
| 2013/0182901 A1* | 7/2013 | Ishida | G06T 7/0012 382/103 |
| 2015/0043800 A1 | 2/2015 | Miyasa et al. | |
| 2015/0070385 A1 | 3/2015 | Ishizu et al. | |
| 2015/0235369 A1 | 8/2015 | Ishida et al. | |
| 2016/0125584 A1 | 5/2016 | Suzuki et al. | |
| 2016/0180526 A1* | 6/2016 | Satoh | G06T 5/50 382/131 |
| 2016/0180527 A1 | 6/2016 | Endo et al. | |

FOREIGN PATENT DOCUMENTS

| | | |
|---|---|---|
| JP | 2012513278 A | 6/2012 |
| JP | 2014-054362 A | 3/2014 |
| JP | 2014140679 A | 8/2014 |
| WO | 2013132402 A2 | 9/2013 |

\* cited by examiner ically tomographic image. 15 apparent from the following description of exemplary embodiments (with reference to the attached drawings).
IMAGE PROCESSING APPARATUS, IMAGE PROCESSING METHOD, IMAGE PROCESSING SYSTEM, AND NON-TRANSITORY COMPUTER-READABLE STORAGE MEDIUM FOR PRESENTING THREE-DIMENSIONAL IMAGES

BACKGROUND OF THE INVENTION

Field of the Invention

The present invention relates to an image processing apparatus, image processing method, image processing system, and non-transitory computer-readable storage medium for presenting a three-dimensional tomographic image.

Description of the Related Art

In the medical field, a doctor performs diagnosis using medical images captured by various modalities such as an MRI (Magnetic Resonance Imaging) apparatus, an ultrasonic diagnosis apparatus, and a PAT (PhotoAcoustic Tomography) apparatus. Furthermore, a doctor performs diagnosis by comparing images captured by the same modality, for example, in different imaging modes, in different imaging body postures, in different phases, or at different imaging dates/times. Note that one of images to be compared with each other will be referred to as a reference image hereinafter, and the other image will be referred to as a target image hereinafter.

Since respective modalities have different imaging principles, images obtained by capturing the same lesion may look different. In addition, even images obtained by capturing the same lesion by the same modality may look different depending on a difference in imaging mode, a difference in imaging date/time, or the like. Japanese Patent Laid-Open No. 2007-14525 proposes a technique of facilitating comparison of a reference image and a target image by adjusting the contrast of the target image so that the cumulative histogram of the target image coincides with that of the reference image based on the origin and maximum pixel value of the cumulative histogram of the reference image. In addition, Japanese Patent Laid-Open No. 2014-54362 proposes a technique of improving the image quality of a target image by performing enhancement filter processing for a corresponding region of the target image based on an edge region detected in a reference image.

Since, however, the method described in Japanese Patent Laid-Open No. 2007-14525 only equalizes the contrast of the reference image and that of the target image, it imposes a problem that it is not always possible to obtain an image in which a region a doctor wants to see is easy to recognize. On the other hand, the method described in Japanese Patent Laid-Open No. 2014-54362 imposes a problem that a region to be seen other than a region corresponding to the edge region of the reference image is not appropriately enhanced, and a problem that even if a region to be seen is identified, an appropriate enhancement method is unknown and thus observation of the region is not always easy.

To solve the above problems, the present invention provides a mechanism of appropriately setting the display parameters of a target image.

SUMMARY OF THE INVENTION

According to one aspect of the present invention, there is provided an image processing apparatus which comprises: an obtaining unit configured to obtain a region of interest in a first image obtained by capturing an object by a first modality; a deriving unit configured to derive a corresponding region corresponding to the region of interest in a second image obtained by capturing the object by a second modality different from the first modality; a parameter setting unit configured to set a display parameter of the second image based on one of pixel information of the corresponding region and pixel information of a region associated with the corresponding region; a generation unit configured to generate a display image of the second image based on the display parameter; and a display control unit configured to perform display control of the display image.

Further features of the present invention will become apparent from the following description of exemplary embodiments (with reference to the attached drawings).

DESCRIPTION OF THE EMBODIMENTS

Embodiments of an image processing apparatus according to the present invention will be described in detail below with reference to the accompanying drawings. Note that the scope of the present invention is not limited to illustrative examples.

First Embodiment

An image processing apparatus according to this embodiment captures an object by different modalities to obtain the first image (reference image) and the second image (target image). Based on information of a region of interest (to be referred to as a lesion region hereinafter) such as a lesion in the first image of the object, the image processing apparatus obtains a region (to be referred to as a corresponding region hereinafter) corresponding to the lesion region in the second image. The image processing apparatus displays the second image using display parameters appropriate for observation of the corresponding region. Alternatively, the image processing apparatus displays the second image using display parameters appropriate for observation of an area (to be referred to as an attention area hereinafter) to which attention is to be paid and which is associated with the corresponding region. The image processing apparatus according to this embodiment has as its feature to set appropriate image display parameters for the second image based on pixel information of the corresponding region (and/or its associated attention area). Note that this embodiment will exemplify a case in which the object is a breast, the first image is an MRI image (an image captured by an MRI apparatus), the second image is a PAT image (an image captured by a PAT apparatus), and the lesion region is the contrast enhanced area of the lesion on the MRI image.

Figure 1:
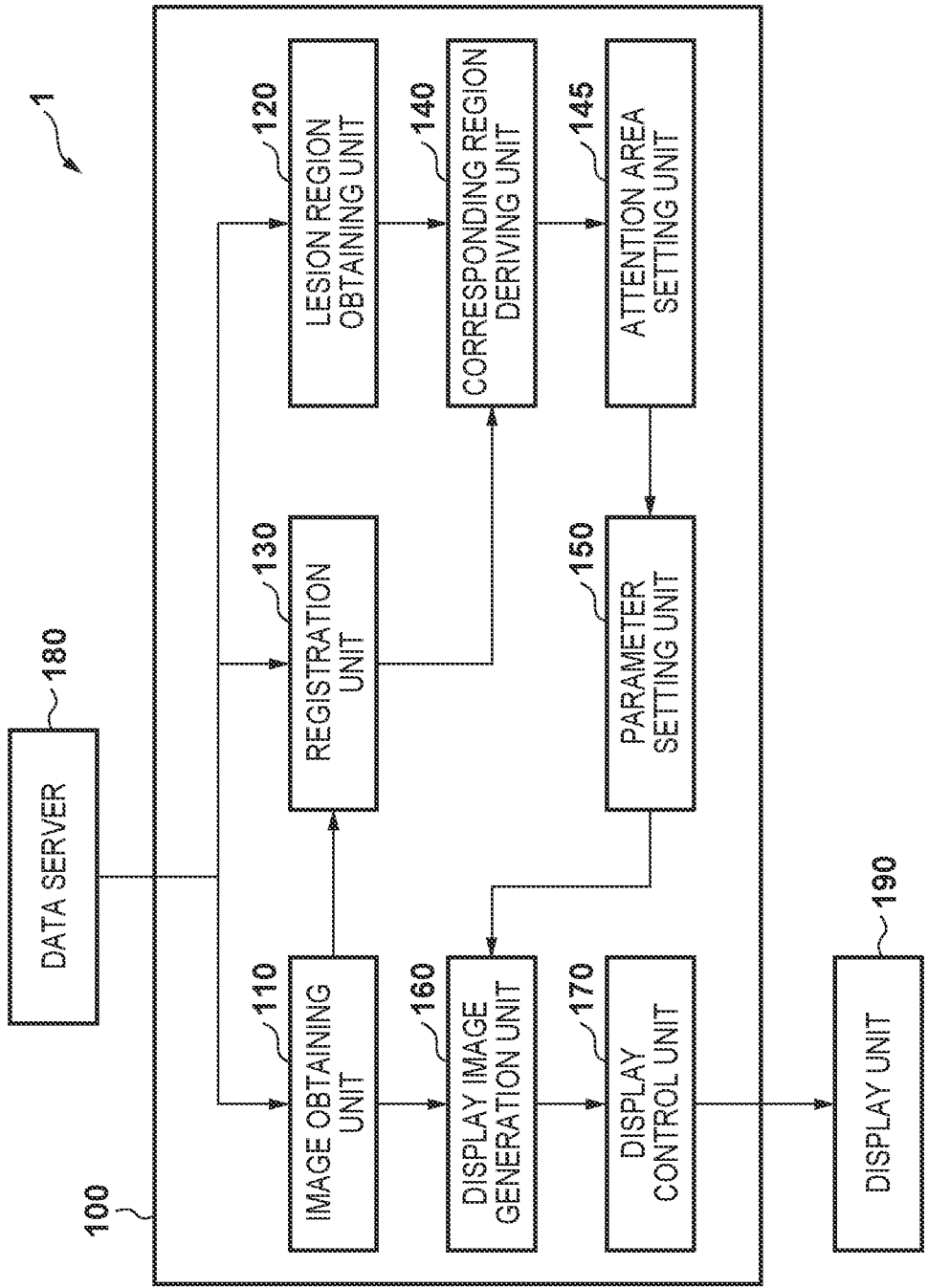
FIG. 1 is a block diagram showing the device configuration of an image processing system and image processing apparatus according to the first embodiment.

FIG. 1 shows the configuration of an image processing system 1 according to this embodiment. As shown in FIG. 1, the image processing system 1 according to this embodiment includes a data server 180, an image processing apparatus 100, and a display unit 190. Note that the constituent elements of the image processing system 1 are not limited to them. The image processing system 1 may include other constituent elements or may not include some of the constituent elements.

The data server 180 holds the first and second images of the object to be observed. The data server 180 also holds, as various kinds of information (accompanying information) accompanying the images, imaging information (modality name, imaging sequence name, body posture, and the like) of each image, patient background information (age, sex, and medical record), test information such as a blood test, and findings information (imaging findings and an imaging diagnosis name by an interpreter) of the first image. The data server 180 holds information representing the lesion region on the first image. In addition, the data server 180 holds registration information between the first and second images. In response to a request from the image processing apparatus 100, the data server 180 outputs these pieces of information to the image processing apparatus 100.

Note that the information representing the lesion region is, for example, an image (to be referred to as a label image hereinafter) representing the contrast enhanced area of a lesion portion in the first image. In other others, the information representing the lesion region is information representing a fully-filled three-dimensional region without any cavity. Alternatively, the information representing the lesion region is information of the center coordinates and size (radius) of the lesion portion or information representing a spherical three-dimensional region obtained based on the information. The lesion region is a region extracted by image processing, or a region manually extracted by a doctor or technician. Note that the number of lesion regions may be one or more.

The registration information between the first and second images is information as a clue for registration or a registration result. As the former information, for example, the data server 180 holds the three-dimensional coordinates of a corresponding point group in, for example, a branch portion of a blood vessel structure common to the first and second images. Corresponding points may be points manually input in advance by a doctor or technician, or points obtained by image processing. Furthermore, as the latter information (registration result), the data server 180 holds rigid transformation parameters, affine transformation parameters, the parameters of a nonlinear deformation model, a deformation field, and the like. These pieces of information are derived in advance using another image processing apparatus (not shown) for associating images and performing registration. The display unit 190 displays an image output from the image processing apparatus 100.

The image processing apparatus 100 includes an image obtaining unit 110, a lesion region obtaining unit 120, a registration unit 130, a corresponding region deriving unit 140, an attention area setting unit 145, a parameter setting unit 150, a display image generation unit 160, and a display control unit 170. The image processing apparatus 100 is connected to the data server 180 and the display unit 190. The image obtaining unit 110 obtains the first and second images of the object from the data server 180. The lesion region obtaining unit 120 obtains the information representing the lesion region on the first image. The registration unit 130 performs registration between the first and second images. The corresponding region deriving unit 140 derives a corresponding region in the second image based on the lesion region in the first image and the registration result. The attention area setting unit 145 sets an attention area (an area whose display parameters are to be optimized) in the second image based on the corresponding region in the second image. The parameter setting unit 150 calculates image display parameters based on information of the attention area in the second image. The display image generation unit 160 generates display images from the first and second images based on the parameters set by the parameter setting unit 150. The display control unit 170 controls to display the generated display images on the display unit 190.

Figure 2:
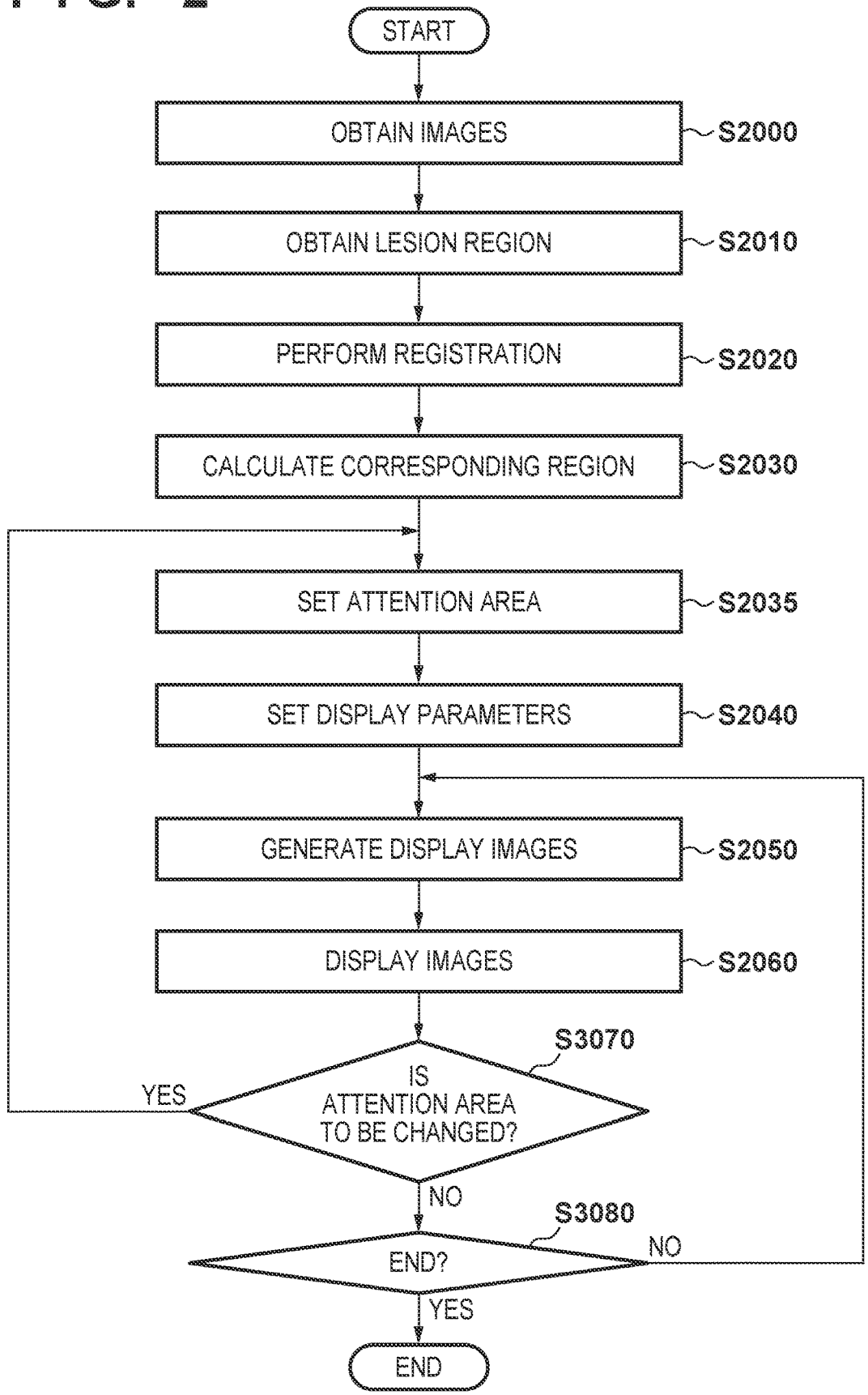
FIG. 2 is a flowchart illustrating the overall processing procedure of the image processing apparatus according to the first embodiment.

A processing procedure executed by the image processing apparatus 100 according to this embodiment will be described next with reference to a flowchart shown in FIG. 2.

(S2000: Obtaining of Images)

In step S2000, as processing by the image obtaining unit 110, the image processing apparatus 100 obtains the first and second images of the object from the data server 180. In addition, the image processing apparatus 100 obtains various kinds of information (to be referred to as accompanying information hereinafter) accompanying the above-described images from the data server 180.

(S2010: Obtaining of Lesion Region)

In step S2010, as processing by the lesion region obtaining unit 120, the image processing apparatus 100 obtains the information representing the lesion region in the first image from the data server 180. Note that if the data server 180 holds no information representing the lesion region, the lesion region obtaining unit 120 does not perform the processing of obtaining the information from the data server 180. In this case, as processing in this step, the lesion region obtaining unit 120 executes image processing of extracting the lesion region (the contrast enhanced area of the lesion portion in this example) from the first image. Alternatively, the operator of the image processing apparatus 100 may input information representing the lesion region to the image processing apparatus 100 while observing a sectional image of the first image displayed on the display unit 190.

The lesion region obtaining unit 120 determines whether input information or an operator instruction satisfies a predetermined condition. The input information is, for example, information input from the data server 180 to the lesion region obtaining unit 120. If the predetermined condition is satisfied, the lesion region obtaining unit 120 performs processing of extracting a clinical attention area from the lesion region (first lesion region) obtained in the above processing, thereby obtaining the second lesion region. For example, if the accompanying information obtained in step S2000 includes findings information of a lesion, the lesion region obtaining unit 120 determines whether the findings information includes predetermined findings. If the findings information includes the predetermined findings, the lesion region obtaining unit 120 executes processing corresponding to contents of the findings.

If, for example, the findings information of the accompanying information includes findings such as a "rim enhancement" or "ring enhancement" as the predetermined findings, the lesion region obtaining unit 120 performs processing of identifying a clinically significant region such as a region where a blood flow can exist in the first lesion region. The lesion region obtaining unit 120 then obtains the identified region as the second lesion region. Since the region where a blood flow can exist has pixel values higher than those in the surrounding region, the lesion region obtaining unit 120, for example, divides the first lesion region into a high-pixel value region and a low-pixel value region using discriminant analysis or the like, and sets the high-pixel value region as the second lesion region.

Note that whether the lesion region obtaining unit 120 extracts the second lesion region may be determined based on a condition other than the findings information. For example, if the operator inputs, via a UI (User Interface) (not shown), an instruction "to pay attention to only the high-pixel value region", the lesion region obtaining unit 120 may extract the second lesion region by discriminant analysis described above. The image processing apparatus 100 may present the first lesion region information to the operator, and the operator may manually input the second lesion region to the image processing apparatus 100 by referring to the presented information. The lesion region obtaining unit 120 may automatically discriminate whether the distribution of the pixel values of the first lesion region corresponds to, for example, a rim enhancement using, for example, a known machine learning method, and perform division based on the discrimination result to obtain the second lesion region.

(S2020: Registration)

In step S2020, as processing by the registration unit 130, the image processing apparatus 100 performs registration processing between the first and second images (processing of obtaining coordinate transformation between the images). For example, a known method such as an FFD (Free-Form Deformation) method based on association of feature points and the image similarity or an LDDMM (Large Deformation Diffeomorphic Metric Mapping) method is used for registration. If a deformation between the images is small or can be ignored (the operator issues an instruction), the registration unit 130 calculates coordinate transformation between the images by linear transformation such as affine transformation or rigid transformation.

Note that if the data server 180 holds a registration result between the first and second images, the registration unit 130 obtains the information from the data server 180, and ends the processing in this step. If the data server 180 holds information as a clue for registration, the registration unit 130 obtains the information from the data server 180, and executes registration processing based on the information. For example, if the registration unit 130 obtains corresponding point information as a clue for registration, it executes registration processing based on corresponding points.

(S2030: Deriving of Corresponding Region)

In step S2030, as processing by the corresponding region deriving unit 140, the image processing apparatus 100 applies the coordinate transformation obtained as the result of step S2020 to the information representing the lesion region in the first image, which has been obtained in step S2010, thereby deriving a corresponding region in the second image. If the information representing the lesion region is a label image, the corresponding region deriving unit 140 derives the corresponding region by applying the coordinate transformation to each point of the label image. Alternatively, if the information representing the lesion region includes the center coordinates and size (radius) of the lesion portion, the corresponding region deriving unit 140 derives, as the corresponding region, a spherical region that is centered on corresponding coordinates calculated by applying the coordinate transformation to the center coordinates and has, as its radius, the size of the region. Note that if there are a plurality of first lesion regions or if the first and second lesion regions have been obtained, the corresponding region deriving unit 140 derives a corresponding region for each of the regions.

(S2035: Setting of Attention Area)

In step S2035, as processing by the attention area setting unit 145, the image processing apparatus 100 sets an attention area in the second image based on information of the corresponding region obtained in step S2030. Basic processing executed by the attention area setting unit 145 is to set the corresponding region as an attention area intact. Note that if there are a plurality of lesion regions, the attention area setting unit 145 sets, as an attention area, the corresponding region of the lesion region designated by the operator via the UI (not shown). Alternatively, the attention area setting unit 145 may set the corresponding regions of all the lesion regions as attention areas. If the corresponding regions of the first and second lesion regions have been obtained in step S2030, the attention area setting unit 145 sets the corresponding region of the second lesion region as an attention area. If, however, the operator issues an instruction via the UI (not shown), the attention area setting unit 145 sets the corresponding region of the first lesion region as an attention area.

Note that before performing the above-described attention area setting processing, the attention area setting unit 145 determines whether input information or an operator instruction satisfies a predetermined condition. The input information is, for example, information input from the data server 180 to the attention area setting unit 145. If the predetermined condition is satisfied, the attention area setting unit 145 obtains a clinical attention area associated with the corresponding region based on the corresponding region in correspondence with contents of the input information or operator instruction, and sets the obtained area as an attention area. If, for example, the accompanying information obtained in step S2000 includes the findings information of the lesion, the attention area setting unit 145 determines whether the findings information includes predetermined findings. If the findings information includes the predetermined findings, the attention area setting unit 145 performs processing corresponding to contents of the findings.

If, for example, the findings information of the accompanying information includes findings such as "ductal carcinoma in situ (DCIS)" as the predetermined findings, the attention area setting unit 145 sets the surrounding region of the corresponding region as an attention area. This is done because the states of a blood vessel and blood flow in the surrounding region of the corresponding region are important. More specifically, after performing expansion processing for the corresponding region, the attention area setting unit 145 sets a region except for the corresponding region as an attention area. Alternatively, the attention area setting unit 145 may perform expansion processing for the corresponding region in only the minor axis direction (a direction perpendicular to the running of a mammary duct) of the corresponding region where a number of blood vessels exist, thereby setting a region except for the corresponding region as an attention area. Note that the operator may be able to manually set an expansion amount at this time. Alternatively, the operator may manually set a region to be expanded.

Note that based on a condition other than the findings information, the attention area setting unit 145 may determine one of the corresponding region and the clinical attention area associated with the corresponding region to be set as an attention area. For example, if the operator inputs, via the UI (not shown), an instruction "to pay attention to the surrounding region of the corresponding region", the attention area setting unit 145 may set an attention area in the surrounding region of the corresponding region by the above-described processing. Even if the findings information satisfies the predetermined condition, the operator may select, via the UI (not shown), one of the corresponding region or its surrounding region to be set as an attention area, and the attention area setting unit 145 may set the attention area in correspondence with the selection.

(S2040: Setting of Display Parameters)

In step S2040, as processing by the parameter setting unit 150, based on the pixel information of the attention area obtained in step S2035, the image processing apparatus 100 sets display parameters for display image generation. The display parameters include, for example, two parameters Window Level (window value: WL) and Window Width (window width: WW), and display image tone processing is performed using these parameters.

The parameter setting unit 150 calculates a maximum pixel value (Lmax) and minimum pixel value (Lmin) with respect to all the pixels of the attention area in the second image. Then, the parameter setting unit 150 sets WW and WL by:

$$WW = L\,max - L\,min \quad (1)$$

$$WL = (L\,max + L\,min)/2 \quad (2)$$

According to these equations, it is possible to set WL/WW with which the entire attention area can be observed at appropriate contrast.

Note that the set display parameters are not limited to them. For example, a luminance value correction parameter such as a gamma correction parameter may be used. In this case, based on the cumulative histogram of the pixel values of all the pixels of the attention area, the parameter setting unit 150 may adjust the parameter so that a histogram after luminance value correction indicates a predetermined distribution.

(S2050: Generation of Display Images)

In step S2050, as processing by the display image generation unit 160, the image processing apparatus 100 generates, as display images, sectional images of the first and second images, which are cut by a cut plane set by the operator. At this time, the display image generation unit 160 applies the display parameters obtained in step S2040 to generate the display image of the second image. Note that the display parameters obtained in step S2040 may be applied to the entire sectional image of the second image or the inside of an attention area on the sectional image. Note that the image processing apparatus 100 may generate display images so as to display only an attention area on the sectional image. This selection is desirably made by the operator using the UI (not shown).

In the latter case (if the display parameters are applied to the inside of the attention area), the parameter setting unit 150 sets the display parameters of an external region except for the attention area by another method. For example, the parameter setting unit 150 sets, as the parameter WL of the external region, the common parameter WL obtained in step S2040. The parameter setting unit 150 can enhance and display the attention area to be readily observed by setting, as the parameter WW of the external region, a value (for example, WW'=α×WW, α>1) that decreases the contrast of the external region, as compared with the attention area. If there are a plurality of attention areas, the parameter setting unit 150 can set display parameters for each attention area.

If the corresponding region is different from the attention area, the parameter setting unit 150 can set different display parameters for the corresponding region and attention area. In these cases, the parameter setting unit 150 need only execute the same parameter setting processing as that in step S2040 for each region (each of the corresponding region and attention area). Note that the cut plane is designated by the operator by operating a keyboard and mouse.

(S2060: Display of Images)

In step S2060, as processing by the display control unit 170, the image processing apparatus 100 controls to display, on the display unit 190, the display images generated in step S2050. FIGS. 3A, 3B, 4A, 4B, 5A, and 5B show examples of the sectional images displayed by the above processing.

Figure 3A:
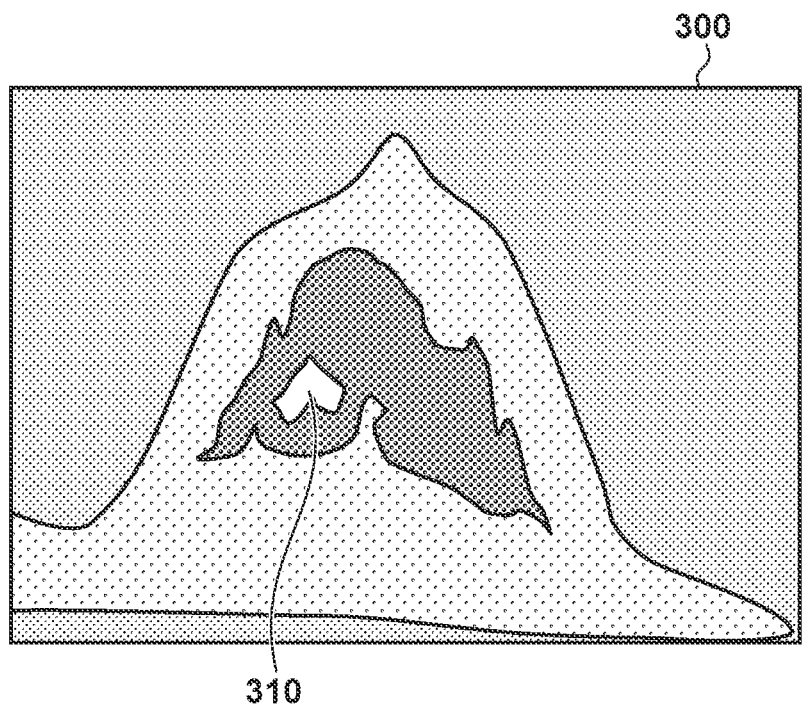
FIGS. 3A and 3B are views for explaining examples of sectional images generated by the image processing apparatus according to the first embodiment.
Figure 3B:
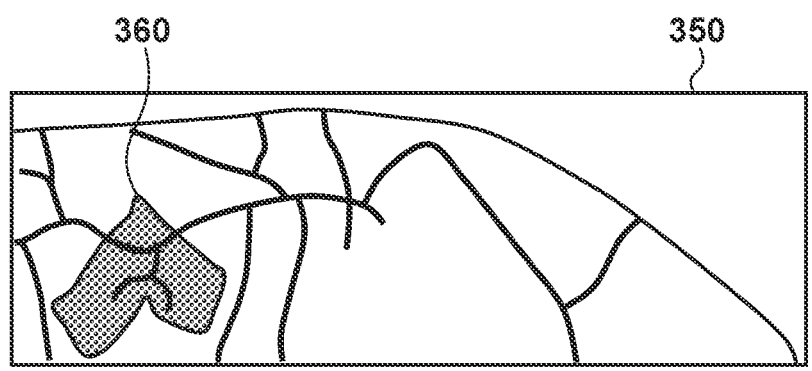

FIGS. 3A and 3B respectively show display examples when the corresponding region in the second image is directly set as an attention area. FIG. 3A shows a display image 300 of the first image and a lesion region 310 in the first image. On the other hand, FIG. 3B shows a display image 350 of the second image and a corresponding region 360 serving as an attention area in the second image. To set display parameters based on pixel information in the corresponding region, the image appropriate for observation of the corresponding region is displayed.

Figure 4A:
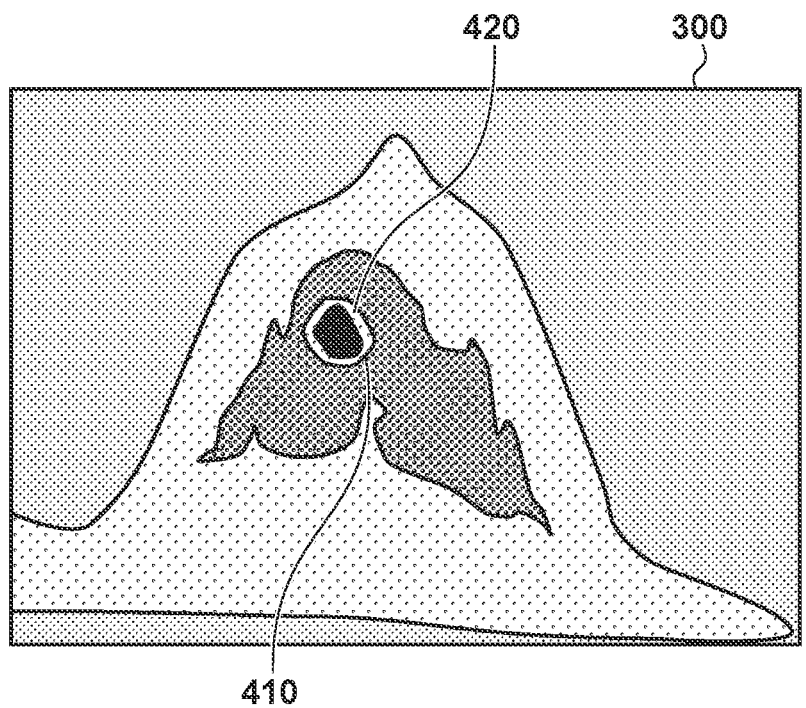
FIGS. 4A and 4B are views for explaining examples of sectional images generated by the image processing apparatus according to the first embodiment.
Figure 4B:
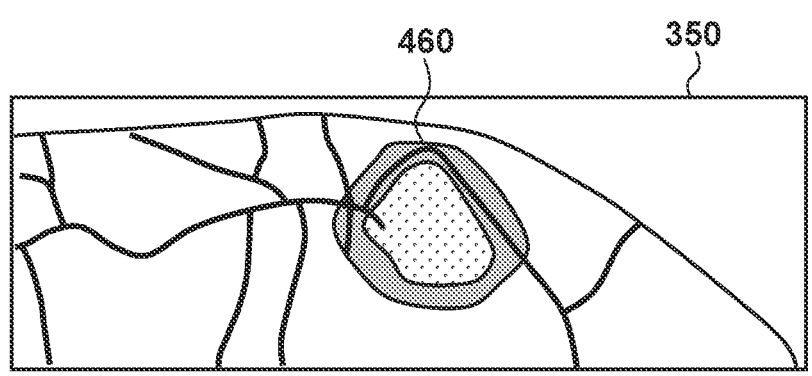

FIGS. 4A and 4B respectively show display examples when the lesion region obtaining unit 120 further obtains the second lesion region from the first lesion region and the attention area setting unit 145 sets the corresponding region of the second lesion region as an attention area. FIG. 4A shows the display image 300 of the first image, a first lesion region 410, and a second lesion region 420. On the other hand, FIG. 4B shows the display image 350 of the second image and a corresponding region 460 (a region filled with gray in FIG. 4B) of the second lesion region serving as the attention area of the second image. The first lesion region 410 is a region including both a high-pixel value region and a low-pixel value region. On the other hand, the second lesion region 420 coincides with the ring-shaped high-pixel value region (enhanced region) in the first lesion region. Since the parameter setting unit 150 sets display image parameters based on pixel information in the corresponding region of the second lesion region (enhanced region), an image appropriate for observation of the second lesion region is displayed.

Figure 5A:
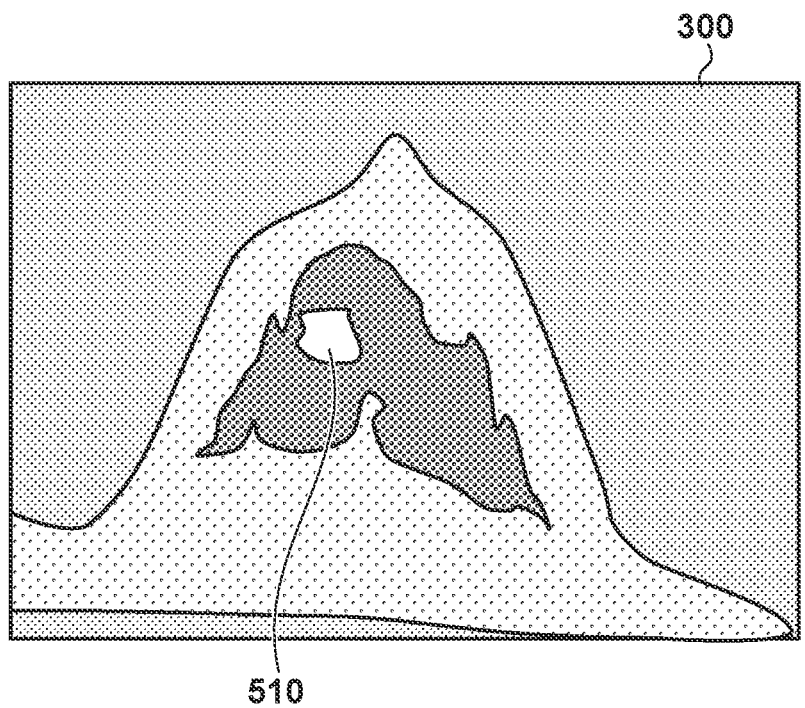
FIGS. 5A and 5B are views for explaining examples of sectional images generated by the image processing apparatus according to the first embodiment.
Figure 5B:
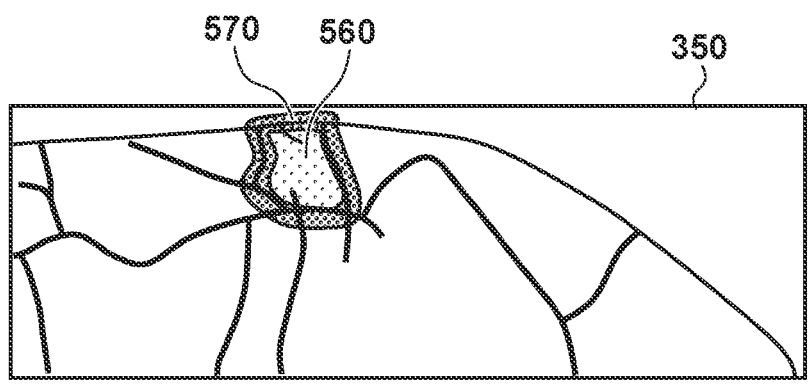

FIGS. 5A and 5B respectively show display examples when the clinical attention area associated with the corresponding region is set as an attention area. FIG. 5A shows the display image 300 of the first image and a lesion region 510 in the first image. On the other hand, FIG. 5B shows the display image 350 of the second image, a corresponding region 560 in the second image, and a surrounding region 570 of the corresponding region serving as the attention area of the second image. Since the parameter setting unit 150 sets display image parameters based on pixel information of the surrounding region of the corresponding region, an image appropriate for observation of blood vessels around the lesion is displayed.

(S3070: Change of Attention Area)

In step S3070, the image processing apparatus 100 determines whether the operator has input, via the UI (not shown), an instruction to change the attention area. For example, the image processing apparatus 100 obtains a change instruction (for example, an instruction to switch to another lesion region, switch between the first and second lesion regions, or switch the region, to which attention is to be paid, between the corresponding region and the surrounding region) input by the operator by, for example, pressing a predetermined key of the keyboard. If the image processing apparatus 100 determines to change the attention area, it returns the process to step S2035, and executes attention area resetting processing (step S2035) and display parameter resetting processing (step S2040) based on the attention area resetting processing. On the other hand, if the image processing apparatus 100 determines not to change the attention area, it advances the process to step S3080.

(S3080: End Determination)

In step S3080, the image processing apparatus 100 determines whether to end the overall processing. For example, the image processing apparatus 100 obtains an end instruction input by the operator by pressing a predetermined key (end key) of the keyboard. If the image processing apparatus 100 determines to end the processing, the overall processing of the image processing apparatus 100 ends. On the other hand, if the image processing apparatus 100 does not determine to end the processing, it returns the process to step S2050 to repeatedly execute processing of displaying display images in correspondence with a new cut plane set by the operator. This executes the processing of the image processing apparatus 100.

As described above, the image processing apparatus according to this embodiment derives a corresponding region (or its associated attention area) in the second image (target image), which corresponds to a lesion region in the first image (reference image). The image processing apparatus generates the second image (target image) adjusted to be easily observed, and displays it. By performing adjustment in this way, even if it is difficult to discriminate, in the second image (target image), a lesion or the like identified in the first image (reference image), it is possible to present an easy-to-observe image to the operator.

Second Embodiment

The first embodiment has exemplified a case in which display parameters for display image generation are set based on the pixel values of the attention area in the second image. However, the present invention is not limited to this, and display parameters may be set further based on the pixel values of the lesion region in the first image (reference image). An image processing apparatus according to this embodiment will be described below with respect to the difference from the first embodiment.

The configuration of an image processing system 1, the operations of the respective units of an image processing apparatus 100, and a processing procedure according to this embodiment are almost the same as those in the first embodiment. However, processing executed by a parameter setting unit 150 in step S2040 is different from that in the first embodiment.

(S2040: Setting of Display Parameters)

In step S2040, as processing by the parameter setting unit 150, the image processing apparatus 100 sets display parameters for display image generation based on pixel information of an attention area obtained in step S2035 and pixel information of a lesion region obtained in step S2010. For example, the parameter setting unit 150 calculates a maximum pixel value (L2 max) and minimum pixel value (L2 min) with respect to all the pixels of the lesion region in the first image (reference image), and sets the second Wind Width (WW2) by:

$$WW2 = L2\ max - L2\ min \qquad (3)$$

In consideration of this value, Window Width (WW') of the attention area in the second image is set by:

$$WW' = w \times WW + (1-w) \times WW2 (0 \le w \le 1) \qquad (4)$$

where w represents a weight coefficient, and is set to, for example, 0.5.

Note that if an attention area associated with a corresponding region in the second image of the lesion region has been set as an attention area, the image processing apparatus 100 obtains a corresponding region in the first image of the attention area, and performs the above processing using the corresponding region instead of the lesion region.

As described above, the image processing apparatus according to this embodiment can readily compare the lesion region in the first image (reference image) with the attention area in the second image.

(Modification 1)

The above embodiment has exemplified a case in which the first image is an MRI image and the second image is a PAT image. However, the images may be images other than the MRI image and the PAT image. The images may be, for example, an ultrasonic image captured by an ultrasonic diagnosis apparatus and a CT image captured by an X-ray CT apparatus. The first and second images may be images captured by the same modality. Specifically, if the object is captured by the same modality in a plurality of imaging modes, images obtained in the different imaging modes may be used as the first and second images. For example, images (for example, a T1-weighted image and T2-weighted image) of different sequences in the MRI apparatus may be used as the first and second images. In addition, the case in which the object is a breast is merely an example, and another organ, a living body other than a human being, an industrial product other than a living body, or the like may be set as an object.

(Modification 2)

If registration between the first and second images is performed in advance (there is no difference in coordinate system or deformation state between the images and the images are aligned in advance so that the same coordinates indicate the same location), the processes in steps S2020 and S2030 can be omitted. This applies to, for example, a case in which an ultrasonic image (ultrasonic echo image) and PAT image captured by a hybrid apparatus capable of capturing an ultrasonic image and PAT image at the same time are displayed. In this case, it is possible to directly set, as a corresponding region in the PAT image, a region (low echo region) which is obtained in the ultrasonic image and suspected as a lesion.

(Modification 3)

The above embodiment has exemplified a case in which an attention area is set based on findings information accompanying the images and the like. However, a corresponding region may be always set as an attention area. In this case, the processing in step S2035 can be omitted.

(Modification 4)

In the aforementioned embodiment, the sectional images of the first and second images are displayed. However, a sectional image of a deformation image obtained by deforming the second image so that its position coincides with that of the first image based on the registration result obtained in step S2020 may be displayed. At this time, the identical sections of the first image and the deformation image of the second image may be displayed in synchronism with each other or may be superimposed and displayed, as needed. Alternatively, a sectional image of a deformation image obtained by deforming the first image so that its position coincides with that of the second image based on the registration result obtained in step S2020 may be displayed. This makes it possible to compare the first and second images more easily. Note that a deformation image generation method based on the registration result between the images is known and a description thereof will be omitted.

(Modification 5)

In the first embodiment, the first image is obtained and displayed. However, it is not always necessary to obtain and display the first image. In this case, another apparatus may display the first image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-259275, filed Dec. 22, 2014, which is hereby incorporated by reference herein in its entirety.

What is claimed is:

1. An image processing apparatus comprising:
    one or more processors; and
    a memory including stored thereon instructions which, when executed by the one or more processors, cause the image processing apparatus to function as:
        an obtaining unit configured to obtain a region of interest in a first image;
        a deriving unit configured to derive a corresponding region corresponding to the region of interest in a second image different from the first image;
        an attention region setting unit configured to set an attention region associated with the corresponding region in the second image, based on finding information associated with at least one of the first image and the second image;
        a parameter setting unit configured to set a display parameter for performing tone processing to enhance the attention region based on pixel information including at least a distribution of pixel values of pixels of the attention region;
        a generation unit configured to generate a display image of the second image based on the display parameter; and
        a display control unit configured to perform display control of the display image.

2. The apparatus according to claim 1, wherein the parameter setting unit sets the display parameter further based on pixel information of the region of interest obtained by the obtaining unit.

3. The apparatus according to claim 1, wherein the obtaining unit obtains a plurality of regions of interest in the first image.

4. The apparatus according to claim 1, wherein the obtaining unit extracts at least one attention area from one region of interest.

5. The apparatus according to claim 4, wherein the deriving unit derives a corresponding region corresponding to the extracted attention area.

6. The apparatus according to claim 5, wherein the obtaining unit extracts at least one attention area based on findings information of the first image.

7. The apparatus according to claim 1, wherein the parameter setting unit sets the display parameter different for the attention region and a region except for the attention region.

8. The apparatus according to claim 1, wherein the parameter setting unit sets the display parameter so that contrast of the attention region becomes higher than that of a region except for the attention region.

9. The apparatus according to claim 1, wherein the instructions which, when executed by the one or more processors, cause the image processing apparatus to further function as:
    a registration unit configured to perform registration processing of the first image and the second image, and
    wherein the deriving unit derives the corresponding region in the second image having undergone the registration processing.

10. The apparatus according to claim 1, wherein the parameter setting unit includes a window value and a window width.

11. An image processing method comprising:
    obtaining a region of interest in a first image;
    deriving a corresponding region corresponding to the region of interest in a second image different from the first image;
    setting an attention region associated with the corresponding region in the second image, based on finding information associated with at least one of the first image and the second image;
    setting a display parameter for performing tone processing to enhance the attention region based on pixel information including at least a distribution of pixel values of pixels of the attention region;
    generating a display image of the second image based on the display parameter; and
    performing display control of the display image.

12. A non-transitory computer-readable storage medium storing a program which causes a computer to execute:
    obtaining a region of interest in a first image;
    deriving a corresponding region corresponding to the region of interest in a second image different from the first image;
    setting an attention region associated with the corresponding region in the second image, based on finding information associated with at least one of the first image and the second image;

setting a display parameter for performing tone processing to enhance the attention region based on pixel information including at least a distribution of pixel values of pixels of the attention region;

generating a display image of the second image based on the display parameter; and performing display control of the display image.

13. The apparatus according to claim 1, wherein the first image is obtained by capturing an object and the second image is obtained by capturing the object.

14. The apparatus according to claim 1, wherein the first image is obtained by capturing an object by a first modality and the second image is obtained by capturing the object by a second modality different from the first modality.

15. The apparatus according to claim 1, wherein the first image is obtained by capturing an object by a first modality and the second image is obtained by capturing the object by the first modality.

16. An image processing apparatus comprising:
one or more processors; and
a memory including stored thereon instructions which, when executed by the one or more processors, cause the image processing apparatus to function as:
an obtaining unit configured to obtain a region of interest in a first image;
a deriving unit configured to derive a corresponding region corresponding to the region of interest in a second image different from the first image;
an attention region setting unit configured to set an attention region associated with the corresponding region in the second image, based on finding information associated with at least one of the first image and the second image; and
a parameter setting unit configured to set a display parameter for performing tone processing to enhance the attention region based on pixel information including at least a distribution of pixel values of pixels of the attention region.

17. The apparatus according to claim 1, wherein the parameter setting unit sets the display parameter based on a maximum pixel value and a minimum pixel value in the corresponding region or the region associated with the corresponding region.

18. The apparatus according to claim 1, wherein the attention region setting unit sets a region surrounding the corresponding region and not including the corresponding region as the attention region.

* * * * *